United States Patent
Goodwin

(10) Patent No.: US 9,870,318 B2
(45) Date of Patent: Jan. 16, 2018

(54) TECHNIQUE TO IMPROVE PERFORMANCE OF MEMORY COPIES AND STORES

(71) Applicant: Advanced Micro Devices, Inc., Sunnyvale, CA (US)

(72) Inventor: Jeremy P. Goodwin, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 206 days.

(21) Appl. No.: 14/339,301

(22) Filed: Jul. 23, 2014

(65) Prior Publication Data

US 2016/0026577 A1  Jan. 28, 2016

(51) Int. Cl.
*G06F 15/00* (2006.01)
*G06F 12/04* (2006.01)

(52) U.S. Cl.
CPC .................. *G06F 12/04* (2013.01)

(58) Field of Classification Search
CPC ............... G06F 3/0605; G06F 12/0802; G06F 12/0866; G06F 12/0862; G06F 2212/312
See application file for complete search history.

(56) References Cited

U.S. PATENT DOCUMENTS

| | | | |
|---|---|---|---|
| 5,014,247 A | 5/1991 | Albachten, III et al. | |
| 5,903,556 A | 5/1999 | Matui | |
| 6,219,773 B1* | 4/2001 | Garibay, Jr. | G06F 9/30043 710/52 |
| 6,704,842 B1 | 3/2004 | Janakiraman et al. | |
| 6,714,994 B1 | 3/2004 | Keller et al. | |
| 7,085,897 B2 | 8/2006 | Blake et al. | |
| 7,174,430 B1 | 2/2007 | O'Krafka et al. | |
| 2001/0016898 A1* | 8/2001 | Ito | G06F 9/30043 711/156 |
| 2002/0144085 A1* | 10/2002 | Hiratsuka | G06F 13/4018 712/25 |
| 2004/0098556 A1* | 5/2004 | Buxton | G06F 9/3001 711/201 |
| 2005/0251633 A1 | 11/2005 | Micka et al. | |
| 2006/0136682 A1* | 6/2006 | Haridas | G11C 7/20 711/154 |
| 2007/0101056 A1* | 5/2007 | Colegrove | G06F 11/1441 711/113 |
| 2008/0235477 A1 | 9/2008 | Rawson | |

(Continued)

*Primary Examiner* — Ryan Bertram
*Assistant Examiner* — Trang Ta
(74) *Attorney, Agent, or Firm* — Rory D. Rankin; Meyertons, Hood, Kivlin, Kowert & Goetzel, P.C.

(57) ABSTRACT

A system and method for efficiently relocating and initializing a block of memory of the computer system. For data initialization and data relocation, multiple registers in a processor are used for intermediate storage of data to be written into the memory. Regardless of whether the amount of data to initialize or relocate is aligned with the register data size, the processor writes the data into the destination buffer with write operations that only utilize the register data size. The write operations utilize the register data size when each of the start and the end of the destination buffer is aligned with the register width, when the start of the destination buffer is unaligned with the register width, when a source buffer and the destination buffer are unaligned with one another for a copy operation, and when the source buffer and the destination buffer overlap.

19 Claims, 13 Drawing Sheets

(56) References Cited

U.S. PATENT DOCUMENTS

| | | | |
|---|---|---|---|
| 2009/0106498 A1 | 4/2009 | Lepak et al. | |
| 2013/0073784 A1* | 3/2013 | Ng | G06F 12/0246 |
| | | | 711/103 |
| 2014/0013030 A1* | 1/2014 | Yeh | G06F 12/0246 |
| | | | 711/103 |
| 2014/0082310 A1* | 3/2014 | Nakajima | G06F 12/0862 |
| | | | 711/162 |
| 2015/0113222 A1* | 4/2015 | Naik | G06F 12/0808 |
| | | | 711/133 |

* cited by examiner

TECHNIQUE TO IMPROVE PERFORMANCE OF MEMORY COPIES AND STORES

BACKGROUND

Field of the Invention

This invention relates computer systems, and more particularly, to relocating and initializing a block of memory of the computer system.

Background

In computing systems, the relocation of data from one location of memory to another location of memory may be performed to reduce input/output (I/O) contention of table spaces or arrays belonging to different owners, to separate the data of different applications, and to copy data from one array to another array in an application. Additional reasons for performing data relocation may include a change in resources such as failing hardware components, hot add/removal of hardware components where the components are added/removed while applications are running, a change in availability of hardware resources due to power management techniques, and optimizing load balances.

During the relocation of data, a register is used to perform the data move or the data copy operation. The register may also be used for an initialization of a location of memory, such as an array. Each of the relocation, initialization and movement of data in memory are performed with one or more instructions. Each instruction may utilize the register for writing data into the memory. When a data entity is to be relocated, initialized or moved in memory, and the data entity has a size equal to the width of the register, a single instruction is used to write the data entity into the memory. For example, the register may have an 8-byte width. A single instruction may be used to write a data entity of 8 bytes into the memory using the register.

When a data entity is to be relocated, initialized or moved in memory, but the data entity has a size less than the width of the register, possibly multiple instructions are used to write the data entity into the memory. Continuing with the above example of the 8-byte register, a single instruction may be used to write a data entity with a size that is less than the width of the register and has a size that is a power-of-2 value, such as a 1-byte, 2-byte, or 4-byte entity. Therefore, 3 instructions may be used to write a 7-byte data entity for a relocation, initialization or movement operation. A first instruction is used to write the 4-byte entity. A second instruction is used to write the 2-byte entity. A third instruction is used to write the 1-byte entity. During the write operation by a single instruction for each data entity, one or more applications are waiting. Accordingly, performance of the one or more applications decreases.

In view of the above, efficient methods and systems for efficiently relocating and initializing a block of memory of the computer system are desired.

SUMMARY OF EMBODIMENTS

Systems and methods for efficiently relocating and initializing a block of memory of the computer system are contemplated. In various embodiments, a computing system includes a memory for storing instructions of a computer program and data for the programs. The computing system also includes a processor for processing the stored instructions; initializing buffers, tables or arrays; and relocating data in the memory. When the processor receives instructions for data initialization or data relocation, one or more registers are used for intermediate storage of data to be written into the memory. The width of a memory line in the memory may be greater than the width of the register. In some embodiments, the memory line width is 64 bytes and the register width is 16 bytes. Regardless of whether the amount of data to initialize or relocate is aligned with the register data size, the processor writes the data into the destination buffer with one or more write operations, wherein each of the one or more write operations utilizes the register data size. For example, if the register width is 16 bytes, each of the one or more write operations utilizes write data with a size of 16 bytes.

Control logic in the processor determines whether each of the start and the end of the destination buffer is aligned with the register width. For the start of the destination buffer to be aligned, an address corresponding to the start location of the destination buffer is an integer multiple of the register data size, such as 16 bytes. For the end of the destination buffer to be aligned, an address corresponding to a location immediately after an end location in the destination buffer is an integer multiple of the register data size, such as 16 bytes.

When the end of the destination buffer is unaligned with the register width, the processor writes the end of the data in the destination buffer with a write operation that begins at an address pointing to a location in the destination buffer located a distance equal to the register width from the end of the destination buffer. For example, when the register width is 16 bytes and the destination buffer has 7 remainder bytes at its end, the last write operation rewrites the last 9 bytes of the previous 16-byte unit in the buffer and the 7 remainder bytes for a total of 16 bytes. Rewriting bytes in the destination buffer with unaligned write operations may reduce the number of write operations and the wait for a software application to resume execution.

The control logic in the processor handles other scenarios such as when the start of the destination buffer is unaligned with the register width, when a source buffer and the destination buffer are unaligned with one another for a copy operation, and when the source buffer and the destination buffer overlap.

These and other embodiments will be further appreciated upon reference to the following description and drawings.

Figure 1:
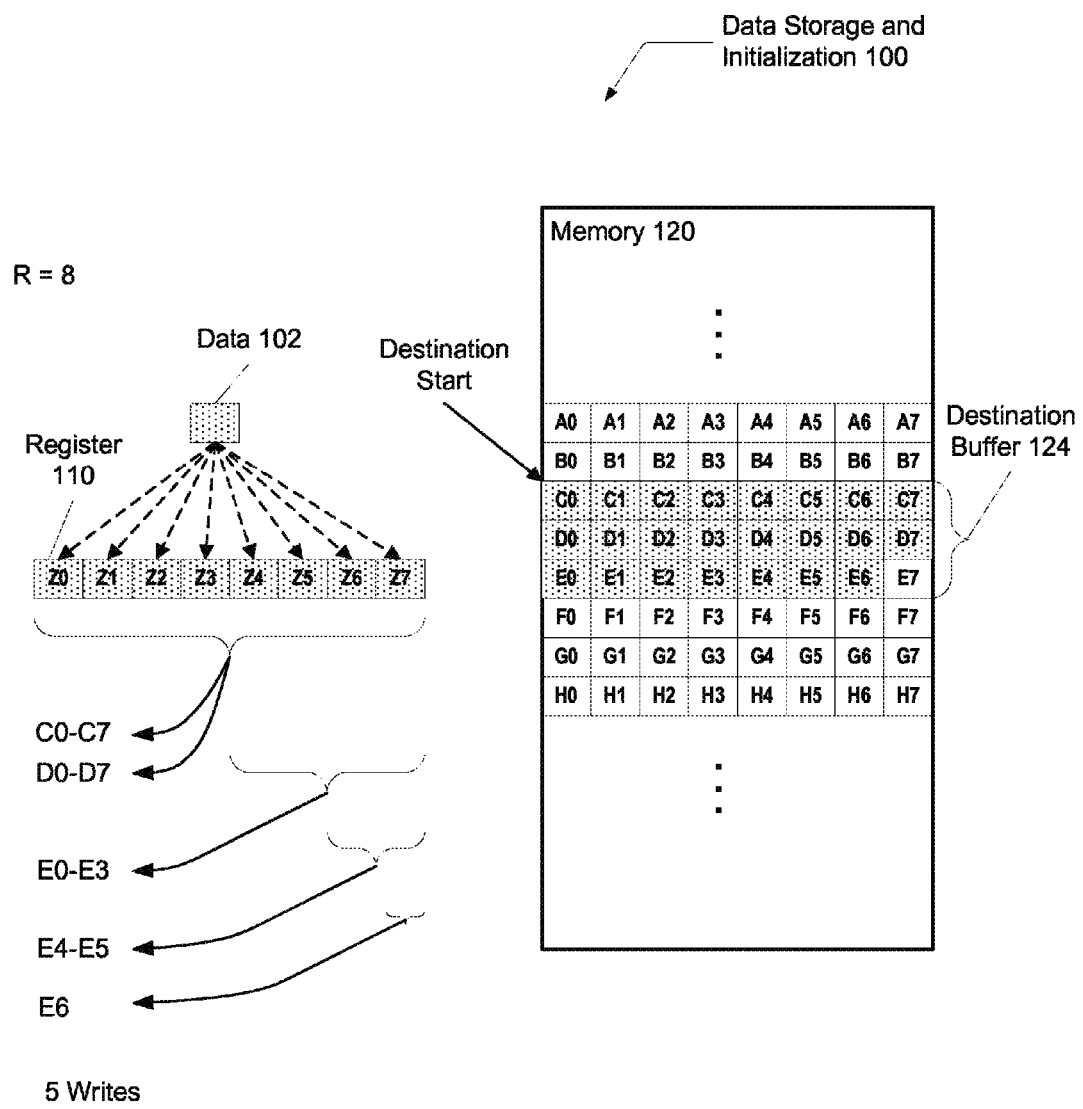
FIG. 1 is a generalized block diagram of one embodiment of data storage and initialization.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENT(S)

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

It will be appreciated that for simplicity and clarity of illustration, elements shown in the figures have not necessarily been drawn to scale. For example, the dimensions of some of the elements are exaggerated relative to other elements.

Terminology. The following paragraphs provide definitions and/or context for terms found in this disclosure (including the appended claims):

In the detailed description that follows, references to "one embodiment," "an embodiment," "an example embodiment," etc., indicate that the embodiment described includes a particular feature, structure, or characteristic. However, it is to be understood that not every embodiment necessarily includes the particular feature, structure, mode of operation, or characteristic. Moreover, such phrases are not necessarily referring to the same embodiment. Alternate embodiments is devised without departing from the scope of the disclosure, and well-known elements of the disclosure may not be described in detail or is omitted so as not to obscure the relevant details. Further, when a particular feature, structure, or characteristic is described in connection with an embodiment, it is submitted that it is within the knowledge of one skilled in the art to affect such feature, structure, or characteristic in connection with other embodiments whether or not explicitly described. In addition, the description refers to particular embodiments as having particular characteristics or performing particular actions using terms such as "does", "is", "uses", "utilizes", or otherwise. However, it is to be understood that various embodiments do not have the described characteristics or perform the described actions. Rather, alternate embodiments are devised without departing from the scope of the disclosure as noted above.

In addition to the above, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to. As used in the appended claims, these terms do not foreclose additional structure or steps. Consider a claim that recites: "A computing system comprising one or more processor cores . . . " Such a claim does not foreclose the computing system from including additional components (e.g., a GPU, one or more memory devices).

"Configured To." Various units, circuits, or other components is described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" also includes adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that affect a determination. That is, a determination is solely based on those factors or based, at least in part, on those factors. Consider the phrase "determine A based on B." While B is a factor that affects the determination of A, such a phrase does not foreclose the determination of A from also being based on C. In other instances, A is determined based solely on B.

Referring to FIG. 1, one embodiment of data storage and initialization 100 in a memory is shown. The register 110 may be used for data initialization, relocation and copying in the memory 120. The register 110 may be included in a processor. The processor is not shown for ease of illustration. The memory 120 may be any memory such as a L1, L2, or L3 cache memory for a processor or system memory such as RAM for a single processor or a group of processors in a processing node of a network. Alternatively, memory 120 may be a hard disk in a computer system or a buffer for a graphics processing unit (GPU), a digital signal processor (DSP) or other processor type.

For ease of illustration, all examples of processors, functional blocks, control logic, and interfaces required both within and outside a computing system are not shown. The components 110 and 120 may be used in various computing products such as a desktop computer, a server, a tablet computer, a gaming console, a laptop computer, a smartphone, and so forth.

In various embodiments, the components 110 and 120 are incorporated upon a single integrated circuit. In other embodiments, the components 110 and 120 may be provided on a system-on-chip (SOC), on separate semiconductor chips on a motherboard or card, or other. One or more processors may access the memory 120. The processors may include a general-purpose processor, such as a central processing unit (CPU), a graphics processing unit (GPU), another type of single-instruction-multiple-data (SIMD) core, a digital signal processor (DSP), an application-specific integrated circuit (ASIC), and so forth. The one or more processors may include multiple processor cores. Each processor core may include circuitry for executing instructions according to a predefined instruction set. For example, the x86® instruction set architecture (ISA) may be selected. Alternatively, the x86-64®, Alpha®, PowerPC®, MIPS®, SPARC®, PA-RISC®, or any other instruction set architecture may be selected.

The width of memory 120 may be 64 bytes, but the width may differ in other embodiments of the invention. The register 110 may have a width of 16 bytes. Therefore, four 16-byte units may fit within a 64-byte memory line or block. However, for ease of illustration, the memory 120 is shown as having a width equal to the width of the register 110. This illustration is chosen for ease of displaying examples for data relocation, initialization and copy. It is noted that while the term "copy" is used herein, it is to be understood that any operation which stores data identified by a source location to a destination is contemplated—whether or not the data in the source location is retained. Accordingly, the terms copy and move may be used interchangeably herein. Data 102 may be used for data initialization. In various embodiments, the size of the data 102 is a byte. In other embodiments, the size of data 102 may differ, as other data sizes are possible and contemplated.

As shown, the register 110 has a width of 8 times the size of data 102. When data 102 has a size of a byte, the register 110 has a width of 8 bytes. The width of register 110 is shown with the value R. Here, the value R is 8. As shown, register 110 has a width of 8 bytes with bytes Z0 to Z7. In other embodiments, the register 110 may have a width that is an integer multiple of the size of data 102, wherein the integer is a value different than 8. For example, in other examples, the size of the register 110 may be 16 bytes, wherein R is 16. In various embodiments, the value R may be set by hardware design requirements for a given processor and it does not change. In other embodiments, the value R may be configurable. For example, a portion of a larger register may be used for data relocation, initialization and copy. The portion used may be configurable.

Memory 120 has a destination buffer 124. The destination buffer may also be referred to as a destination region. It is noted that while the term "buffer" is used herein, it is to be understood that any region of memory, which stores data, pointed to by a starting address is contemplated. For example, the buffer could be a table, an array, or an object identified and used by a software application. These data entities may be initialized or set to a given value. The data stored in these data entities may be modified, read out, copied or moved.

A software application may initialize a portion of the destination buffer 124 or the entire destination buffer 124. For example, a function call within the software application may write a value stored in data 102 in each byte in the destination buffer 124. In other examples, the function call may write a value stored in data 102 in particular bytes within the destination buffer 124. As shown in the illustrated example, the destination buffer 124 has at least 23 bytes. The bytes to be initialized in the destination buffer 124 include bytes C0-C7, D0-D7 and E0-E6. The beginning of the destination buffer 124 is at byte C0. The end of the destination buffer 124 may be at byte E6. Alternatively, the end of the destination buffer 124 may be at byte E7 or a later byte such as G7. The end of the region to be initialized is at byte E6, though.

Each of the bytes to be initialized, such as bytes C0-C7, D0-D7 and E0-E6, in the destination buffer 124 is written with the value stored in data 102. For example, in each of the C programming language and the C++ programming language, the function call memset is used to initialize a block of memory, such as the destination buffer 124. The memset function call receives as arguments a pointer identifying the start of the block of memory, a number of bytes to set, wherein the number of bytes are located at the start of the block of memory; and a value used to set each of the number of bytes. The register 110 may be used to perform the initialization of the destination buffer 124. The value stored in data 102 may be replicated in each of the bytes Z0-Z7 in the register 110.

As shown, 5 write operations may be used to initialize the destination buffer 124 with the use of the register 110. The first write operation or instruction may store the contents in bytes Z0-Z7 in the bytes C0-C7 in the destination buffer 124. The second write operation or instruction may store the contents in bytes Z0-Z7 in the bytes D0-D7 in the destination buffer 124. The third write operation may store the contents in bytes Z0-Z3 in the bytes E0-E3 in the destination buffer 124. The fourth write operation may store the contents in bytes Z0-Z1 in the bytes E4-E5 in the destination buffer 124. The fifth write operation may store the contents in byte Z0 in the byte E6 in the destination buffer 124.

As shown, the destination buffer 124 has 7 remainder bytes. Three write operations are used to write the 7 remainder bytes. Here, the write operations utilize data with a power-of-2 size. Alternatively, a single byte may have been used for each write operation and 7 write operations would have been used, rather than 3 write operations. Each of the write operations utilizing a data size less than the R-byte register also uses if-then branching statements, which consume time and cause the software application to wait. As multiple write operations are used to store the 7 remainder bytes, the software application waits, which reduces performance.

Figure 2:
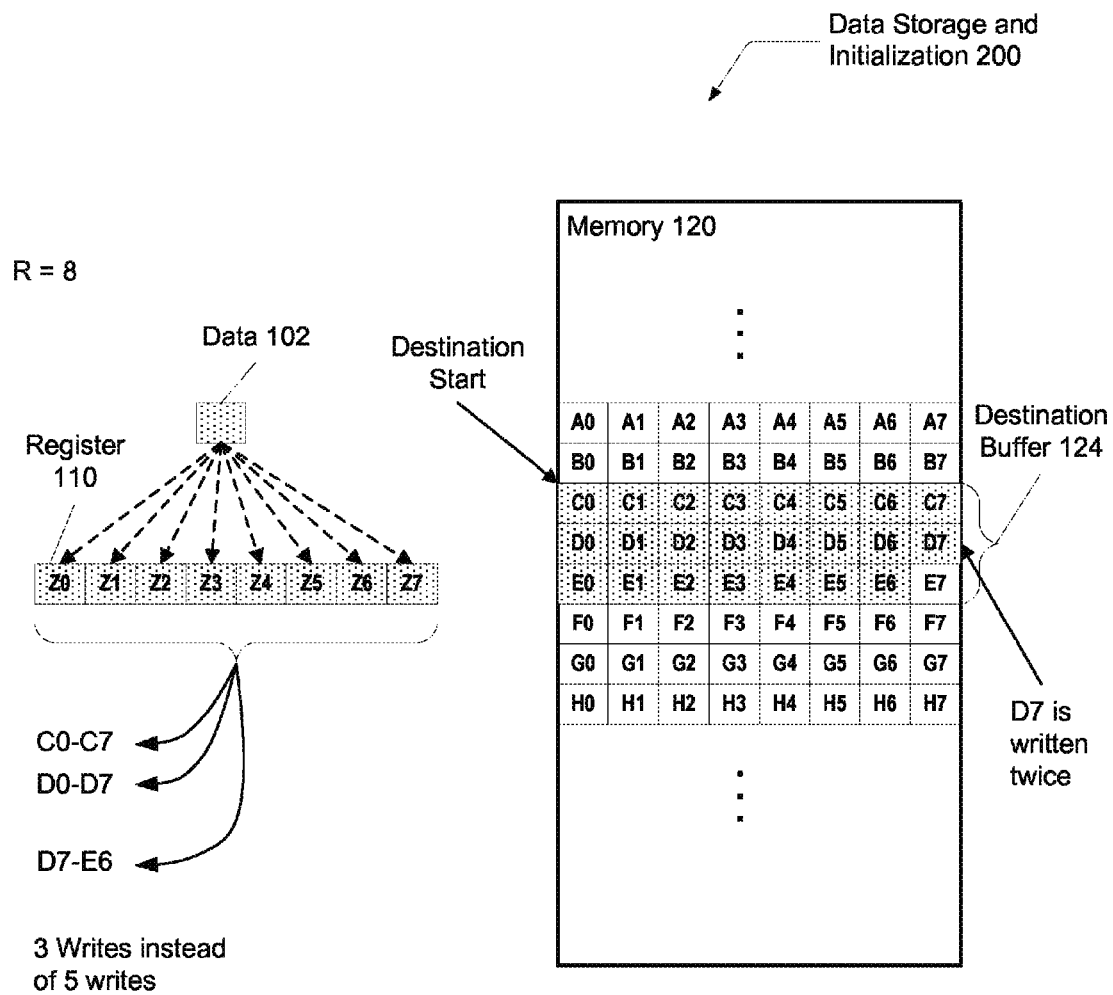
FIG. 2 is a generalized block diagram of another embodiment of data storage and initialization.

Referring to FIG. 2, another embodiment of data storage and initialization 200 in a memory is shown. The data 102 and the register 110 may be used to initialize the destination buffer 124 within the memory 120. Again, the width of the register 110, denoted by the value R, is 8. The value stored in data 102 may be replicated in each of the bytes Z0-Z7 in the register 110.

Each of the bytes to be initialized, such as bytes C0-C7, D0-D7 and E0-E6, in the destination buffer 124 is written with the value stored in data 102. As shown, 3 write operations may be used to initialize the destination buffer 124 with the use of the register 110. The first write operation or instruction may store the contents in bytes Z0-Z7 in the bytes C0-C7 in the destination buffer 124. The second write operation or instruction may store the contents in bytes Z0-Z7 in the bytes D0-D7 in the destination buffer 124. The third write operation is an unaligned write operation. The starting addresses of the previous two write operations were aligned with the size of the register 110. Each of the starting addresses of the previous two write operations was an integer multiple of the size of the register 110. For example, when the registers 110 and 130 have a size of 8 bytes, the starting addresses of the previous two write operations are 8-byte aligned. The starting address of the third write operation is not an integer multiple of the size of the register 110. Therefore, the third write operation is unaligned with the width of the register 110.

The third write operation may store the contents in bytes Z0-Z7 in the bytes D7-E6 in the destination buffer 124. The byte D7 is written twice during the initialization. The byte D7 is written during the second write operation and again during the third write operation, which is an unaligned write operation. However, the 7 remainder bytes are written with a single write operation, rather than multiple write operations. The software application does not wait beyond the single write operation for the remainder bytes and performance may increase. For example, in some gaming applications, class objects of 256 bytes or less are reassigned often and waiting for multiple write operations to complete for the remainder bytes may decrease performance.

Figure 3:
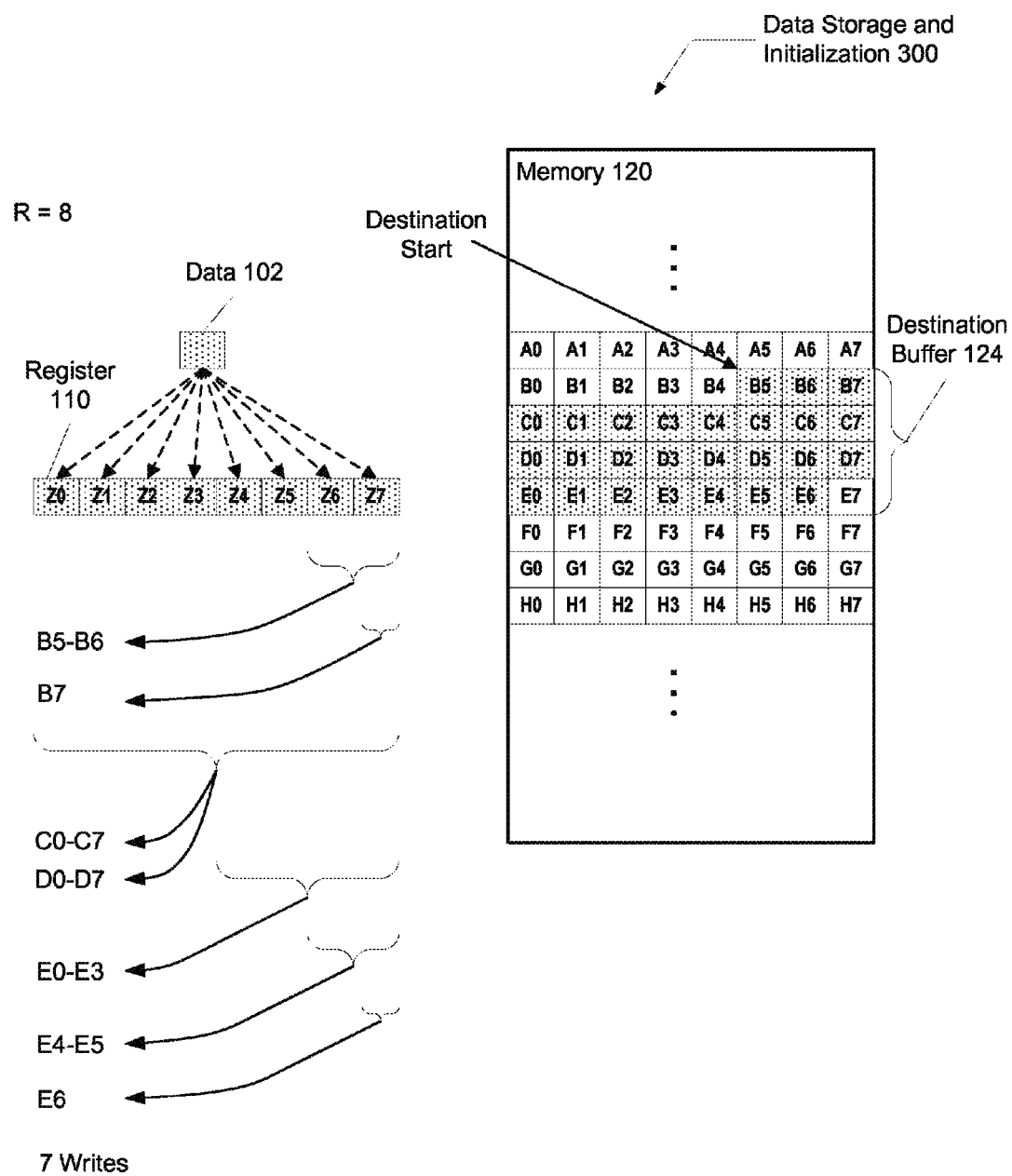
FIG. 3 is a generalized block diagram of yet another embodiment of data storage and initialization.

Referring to FIG. 3, yet another embodiment of data storage and initialization 300 in a memory is shown. The data 102 and the register 110 may be used to initialize the destination buffer 124 within the memory 120. Again, the width of the register 110, denoted by the value R, is 8. The value stored in data 102 may be replicated in each of the bytes Z0-Z7 in the register 110.

As shown in the illustrated example, the destination buffer 124 has at least 26 bytes. The bytes to be initialized in the destination buffer 124 include bytes B5-B7, C0-C7, D0-D7 and E0-E6. The beginning of the destination buffer 124 is at byte B5. The end of the destination buffer 124 may be at byte E6. Alternatively, the end of the destination buffer 124 may be at byte E7 or a later byte such as G7.

Each of the bytes to be initialized, such as bytes B5-B7, C0-C7, D0-D7 and E0-E6, in the destination buffer 124 is written with the value stored in data 102. The destination buffer 124 has 3 alignment bytes at the start of the region to be initialized. In addition, the destination buffer has 7 remainder bytes at the end of the region to be initialized. As shown, 7 write operations may be used to initialize the destination buffer 124 with the use of the register 110. The first two write operations may be used to initialize the alignment bytes. The final three write operations may be used to initialize the remainder bytes.

The first write operation may store the contents in bytes Z0-Z1 in the bytes B5-B6 in the destination buffer 124. The second write operation may store the contents in byte Z0 in the byte B7 in the destination buffer 124. In various embodiments, after the alignment bytes are initialized, the third write operation or instruction may store the contents in bytes Z0-Z7 in the bytes C0-C7 in the destination buffer 124. The fourth write operation or instruction may store the contents in bytes Z0-Z7 in the bytes D0-D7 in the destination buffer 124.

Continuing with the initialization of the destination buffer 124, the fifth write operation may store the contents in bytes Z0-Z3 in the bytes E0-E3. The sixth write operation may store the contents in bytes Z0-Z1 in the bytes E4-E5 in the destination buffer 124. The seventh write operation may store the contents in byte Z0 in the byte E6 in the destination buffer 124. As shown, two write operations are used to initialize the 3 alignment bytes and three write operations are used to initialize the 7 remainder bytes. Here, the write operations utilize data with a power-of-2 size. Alternatively, a single byte may have been used for each write operation and 10 write operations would have been used for initializing the alignment bytes and the remainder bytes, rather than 5 write operations. As multiple write operations are used to initialize the alignment bytes and the remainder bytes, the software application waits, which reduces performance.

Figure 4:
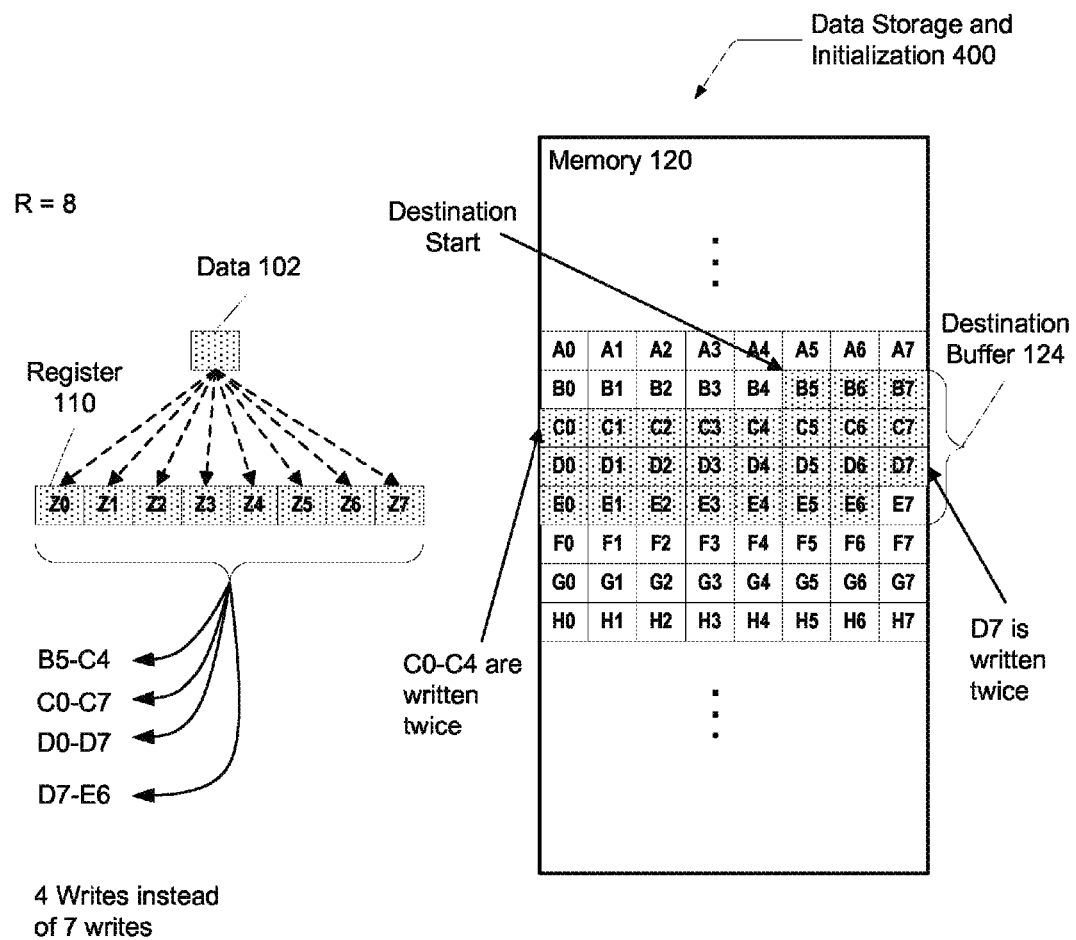
FIG. 4 is a generalized block diagram of yet another embodiment of data storage and initialization.

Referring to FIG. 4, yet another embodiment of data storage and initialization 400 in a memory is shown. The data 102 and the register 110 may be used to initialize the destination buffer 124 within the memory 120. Again, the width of the register 110, denoted by the value R, is 8. The value stored in data 102 may be replicated in each of the bytes Z0-Z7 in the register 110.

The bytes to be initialized in the destination buffer 124 include bytes B5-B7, C0-C7, D0-D7 and E0-E6. Similar to the previous example, the destination buffer 124 has 3 alignment bytes at the start of the region to be initialized. In addition, the destination buffer has 7 remainder bytes at the end of the region to be initialized. The beginning of the destination buffer 124 is at byte B5. The end of the destination buffer 124 may be at byte E6. Alternatively, the end of the destination buffer 124 may be at byte E7 or a later byte such as G7. Each of the bytes to be initialized, such as bytes B5-B7, C0-C7, D0-D7 and E0-E6, in the destination buffer 124 is written with the value stored in data 102.

As shown, 4 write operations may be used to initialize the destination buffer 124 with the use of the register 110. The first write operation or instruction may store the contents in bytes Z0-Z7 in the bytes B5-C4 in the destination buffer 124. The first write operation is an unaligned write operation. The second write operation may store the contents in bytes Z0-Z7 in the bytes C0-C7 in the destination buffer 124. The bytes C0-C4 are written twice during the initialization. The bytes C0-C4 are written during the first write operation and again during the second write operation, which is an unaligned write operation. The third write operation may store the contents in bytes Z0-Z7 in the bytes D0-D7 in the destination buffer 124.

The fourth write operation is an unaligned write operation. The fourth write operation may store the contents in bytes Z0-Z7 in the bytes D7-E6 in the destination buffer 124. The byte D7 is written twice during the initialization. The byte D7 is written during the third write operation and again during the fourth write operation, which is an unaligned write operation.

Figure 5:
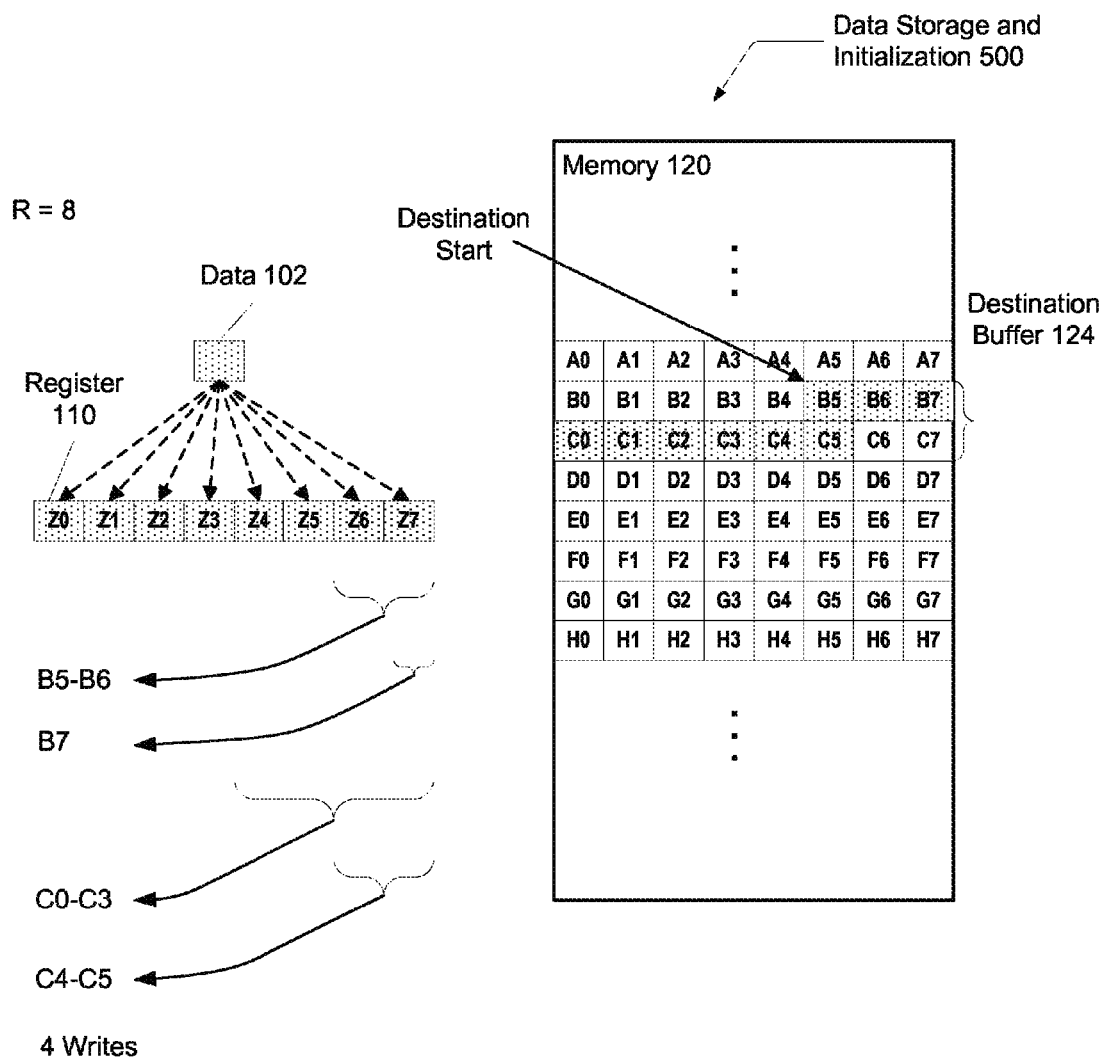
FIG. 5 is a generalized block diagram of yet another embodiment of data storage and initialization.

Referring to FIG. 5, yet another embodiment of data storage and initialization 500 in a memory is shown. Similar to the previous examples, the data 102 and the register 110 may be used to initialize the destination buffer 124 within the memory 120. Again, the width of the register 110, denoted by the value R, is 8. The value stored in data 102 may be replicated in each of the bytes Z0-Z7 in the register 110.

As shown in the illustrated example, the destination buffer 124 has at least 9 bytes. The bytes to be initialized in the destination buffer 124 include bytes B5-C5. The number of bytes to initialize is between the value R and the value 2R. The beginning of the destination buffer 124 is at byte B5. The end of the destination buffer 124 may be at byte C5. Alternatively, the end of the destination buffer 124 may be at byte C7 or a later byte in the memory 120.

Each of the bytes to be initialized, such as bytes B5-C5 in the destination buffer 124 is written with the value stored in data 102. The destination buffer 124 has 3 alignment bytes at the start of the region to be initialized. In addition, the destination buffer has 6 remainder bytes at the end of the region to be initialized. As shown, 4 write operations may be used to initialize the destination buffer 124 with the use of the register 110. Using the steps described earlier, the first two write operations may be used to initialize the alignment bytes. The final two write operations may be used to initialize the remainder bytes.

Figure 6:
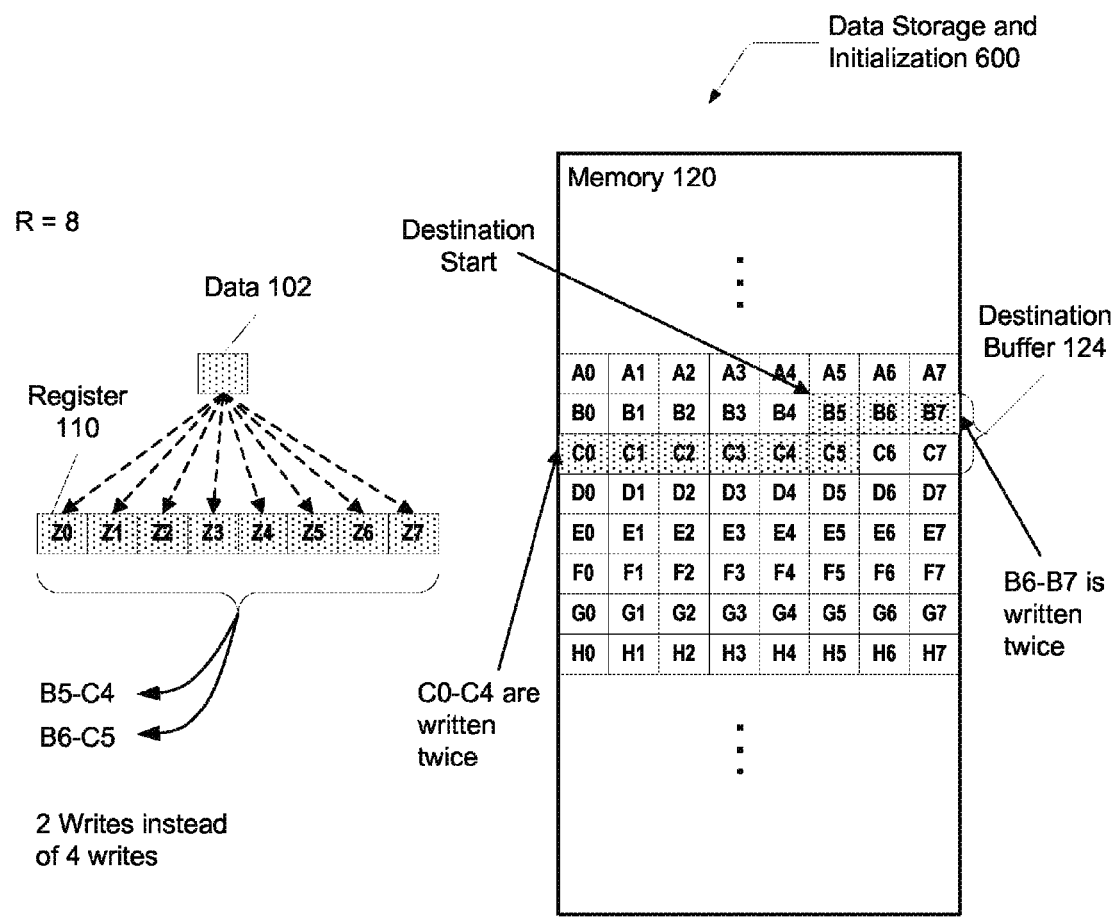
FIG. 6 is a generalized block diagram of yet another embodiment of data storage and initialization.

Referring to FIG. 6, yet another embodiment of data storage and initialization 600 in a memory is shown. The data 102 and the register 110 may be used to initialize the destination buffer 124 within the memory 120. Again, the width of the register 110, denoted by the value R, is 8. The value stored in data 102 may be replicated in each of the bytes Z0-Z7 in the register 110.

Similar to the previous example, the bytes to be initialized in the destination buffer 124 include bytes B5-C5. The destination buffer 124 has 3 alignment bytes at the start of the region to be initialized. In addition, the destination buffer has 6 remainder bytes at the end of the region to be initialized. The number of bytes to initialize is between the value R and the value 2R.

Each of the bytes to be initialized, such as bytes B5-C5 in the destination buffer 124 is written with the value stored in data 102. As shown, 2 write operations may be used to initialize the destination buffer 124 with the use of the register 110. Each of the two write operations are unaligned. The first write operation may store the contents in bytes Z0-Z7 in the bytes B5-C4 in the destination buffer 124. The second write operation may store the contents in bytes Z0-Z7 in the bytes B6-C5 in the destination buffer 124. The bytes B6-B7 and C0-C4 are written twice during the initialization.

Figure 7:
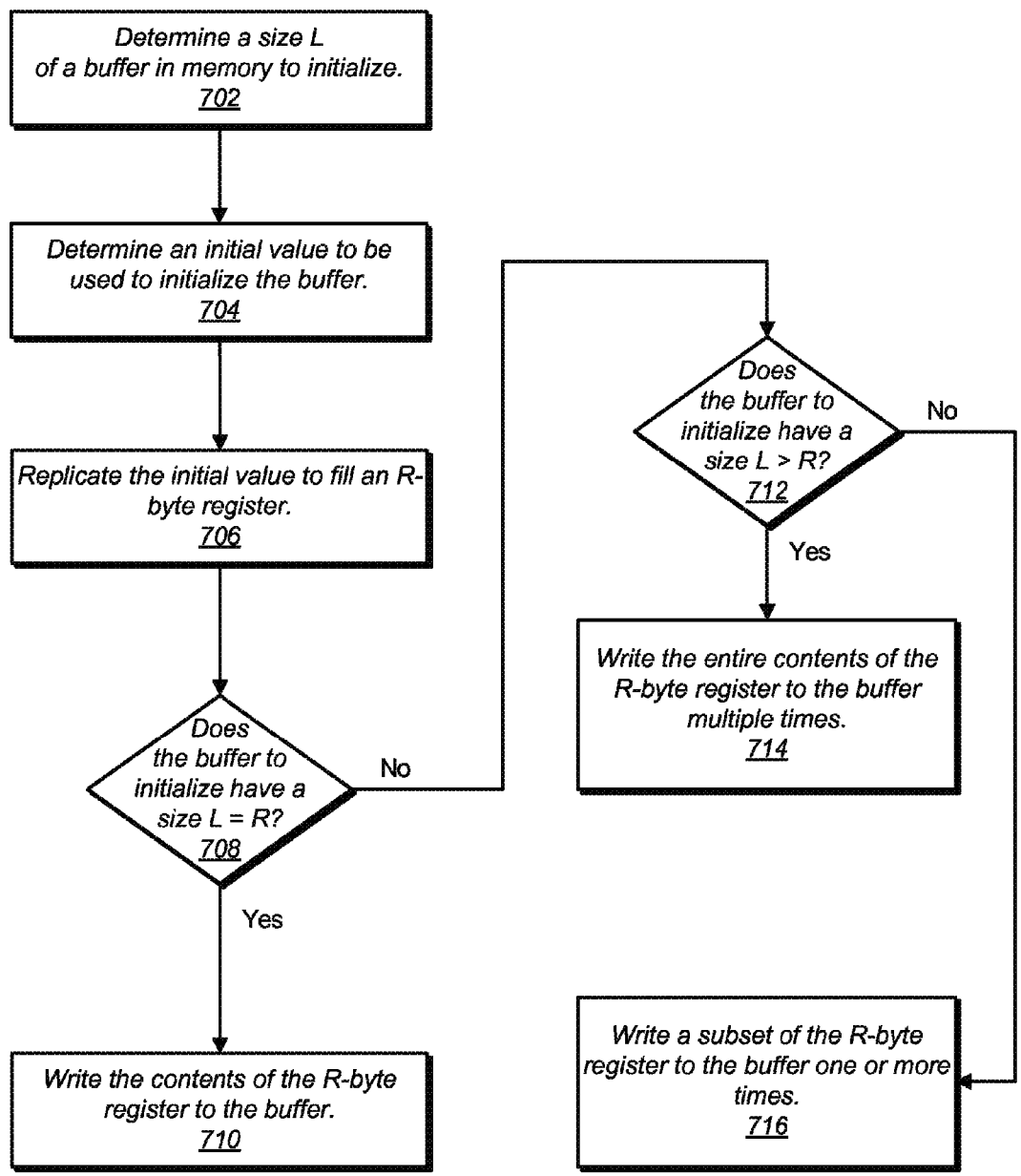
FIG. 7 is a generalized flow diagram of one embodiment of a method for efficiently initializing a buffer in memory.

Turning now to FIG. 7, one embodiment of a method 700 for efficiently initializing a buffer in memory is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 702, a size L of a buffer in memory to initialize is determined. For example, in each of the C programming language and the C++ programming language, the function call memset is used to initialize a block of memory. The memset function call receives as arguments a pointer identifying the start of the block of memory, a number of bytes to set, wherein the number of bytes are located at the start of the block of memory; and a value used to set each of the number of bytes. The size L of the buffer is provided as an argument in the function call.

In block 704, an initial value to be used to initialize the buffer is determined. Again, the initial value may be provided as an argument in a function call used for initializing a buffer. A register in a processor may be used during the initialization operation. The register may have a size of R bytes. In block 706, the initial value may be replicated in the R-byte register.

If the buffer to initialize has a size L that equals the size R of the register (conditional block 708), then in block 710, the entire contents of the R-byte register are written to the buffer. If the buffer to initialize has a size L that is greater than the size R of the register (conditional block 712), then in block 714, the entire contents of the R-byte register are written to the buffer multiple times. The number of times the entire contents of the R-byte register are written is further described shortly. The steps may include the steps shown in the earlier examples in FIGS. 2, 4, and 6.

If the buffer to initialize has a size L that is less than the size R of the register (conditional block 712), then in block 716, a subset of the R-byte register is written to the buffer one or more times. For example, the write operations may utilize data with a power-of-2 size. Alternatively, a single byte may be used for each write operation.

Figure 8:
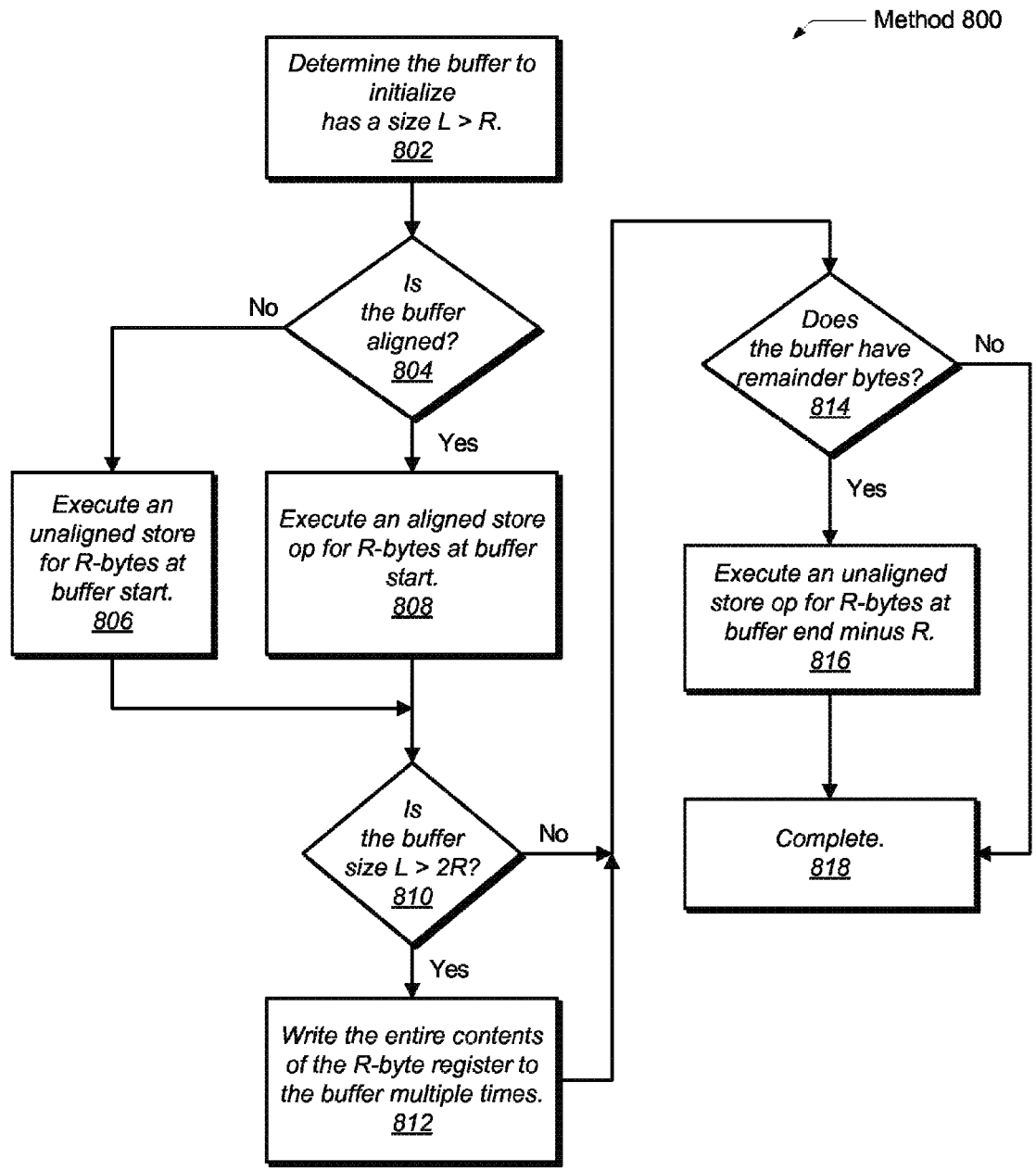
FIG. 8 is a generalized flow diagram of another embodiment of a method for efficiently initializing a buffer in memory.

Turning now to FIG. 8, another embodiment of a method 800 for efficiently initializing a buffer in memory is shown. In block 802, it is determined the buffer to initialize has a size L greater than the size R of a processor register used during the initialization operation. In some cases, the buffer is aligned with a starting address that is an integer multiple of the size of the register and no offset. The earlier examples in FIGS. 1 and 2 utilized an aligned buffer. The earlier examples in FIGS. 3-6 utilized a buffer that is unaligned. The starting addresses of the unaligned buffers have a starting address that is not a multiple of the size of the register.

If the buffer is not aligned (conditional block 804), then in block 806, the entire contents of the R-byte register are written to the buffer beginning at the start of the buffer. An unaligned write operation, such as an unaligned store instruction, may be used to perform the write to the buffer in memory. If the buffer is aligned (conditional block 804), then in block 808, the entire contents of the R-byte register are written to the buffer beginning at the start of the buffer. An aligned write operation, such as an aligned store instruction, may be used to perform the write to the buffer in memory.

If the buffer to initialize has a size L that is greater than double the size R of the register (conditional block 810), then in block 812, the entire contents of the R-byte register are written to the buffer multiple times. The number of times the entire contents of the R-byte register are written is based on the number of R-byte blocks are in the buffer between the first aligned byte and any remainder bytes. For example, in the previous examples in FIGS. 3 and 4, there are 2 R-byte blocks starting at the first aligned byte C0 and byte D7 before the remainder bytes. Therefore, two aligned write operations, or two aligned store instructions, are used to write the entire contents of the R-byte register twice into the buffer. If an unaligned store instruction was used to write the first bytes of the buffer, then some of the bytes may be written twice. In the previous example in FIG. 4, the bytes C0-C4 are written twice.

If the buffer does have remainder bytes (conditional block 814), then in block 816, the entire contents of the R-byte register are written to the buffer beginning at the byte which is R bytes from the end of the buffer. An unaligned write operation, such as an unaligned store instruction, may be used to perform the write to the buffer in memory. In the previous examples in FIGS. 2 and 4, the unaligned store instruction begins writing data at byte D7. The byte D7 is written twice. If the buffer does not have remainder bytes (conditional block 814), then in block 818, the initialization operation is completed. Although some bytes may be overwritten during the initialization operation, executing unaligned store instructions that utilize the entire contents of the R-byte register reduces the total number of instructions to perform. The software application waits less for initialization to complete and performance increases.

Figure 9:
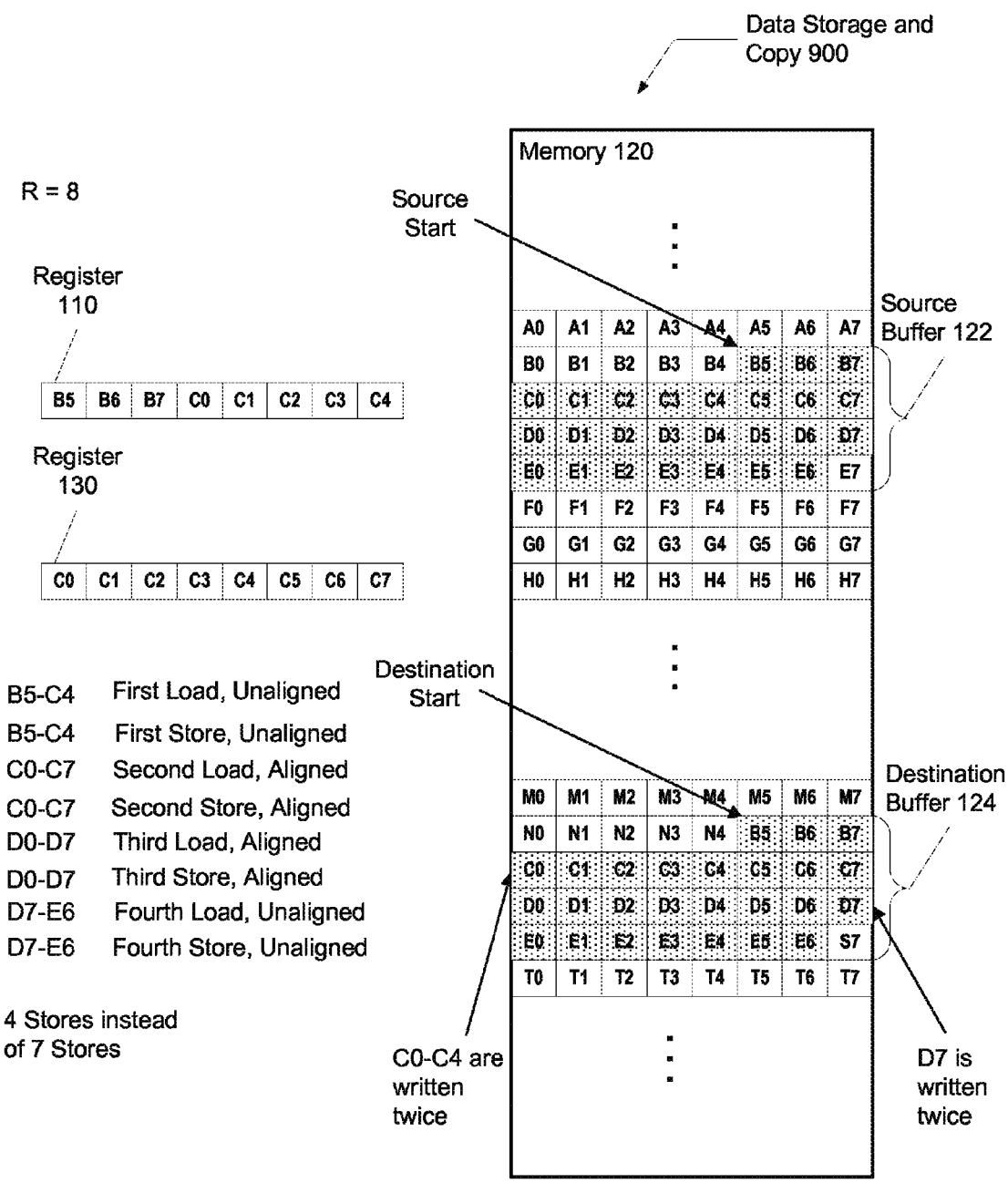
FIG. 9 is a generalized block diagram of one embodiment of data storage and copying.

Referring now to FIG. 9, one embodiment of data storage and copying 900 in a memory is shown. Similar to the previous examples for data initialization, the memory 120 may be any memory and the memory 120 may store buffers for software applications. One or more processors may access the memory 120. Although the width of the memory 120 is shown for ease of illustration as being the same as the width of the registers 110 and 130, in other embodiments, the width of the memory 120 may be greater than the width of the registers 110 and 130. For example, in various embodiments, the width of the memory 120 is 64 bytes and the width of the registers 110 and 130 is 16 bytes.

The source buffer 122 in the memory 120 stores data to be copied into the destination buffer 124. Multiple registers may be used for the data copy operation. The registers 110 and 130 may be included in a processor and may be used for data copying. Similar to previous examples for data initialization, for ease of illustration, processors, functional blocks, control logic, and interfaces required both within and outside a computing system are not shown.

A software application may copy a portion or the entire region from the source buffer 122 to the destination buffer 124. For example, a function call within the software application may perform the copy operation for arrays, tables or other memory regions. In each of the C programming language and the C++ programming language, the function call memcpy is used to copy data from one buffer to another buffer.

The memcpy function call receives as arguments a pointer identifying the start of the source buffer, a pointer identifying the start of the destination buffer, and a number of bytes to copy from the start of the source buffer to the start of the destination buffer. One or more registers, such as registers 110 and 130, may be used to perform the copy operation, such as when a function call is performed. Although two registers are shown, another number of registers is possible and contemplated. As shown, the registers 110 and 130 have a same width of 8 bytes. However, other widths are possible and contemplated.

As shown in the illustrated example, the source buffer 122 begins at byte B5 and ends at byte E6. The destination buffer begins at byte N5 (not shown) and ends at byte S6 (not shown). After the copy operation, the destination buffer 124 will store bytes B5 to E6 as shown. The source buffer 122 and the destination buffer 124 do not overlap in this example. The starting addresses of the buffers 122 and 124 are unaligned with the size of the registers 110 and 130. In this example, the starting addresses for the buffers 122 and 124 are not on an 8-byte boundary. Each of the buffers 122 and 124 has 7 remainder bytes. In addition, each of the source buffer 122 and the destination buffer 124 has a same starting offset of 5 bytes.

As shown, four pairs of read and write operations are performed to copy bytes B5-E6 from the source buffer 122 to the destination buffer 124. The first pair and the last pair of operations are unaligned whereas the middle two pairs of operations are aligned. The bytes C0-C4 and D7 are written twice as was the case for the earlier initialization examples.

As shown, the first load instruction reads the bytes B5-C4, which is an unaligned read access from the source buffer 122. These are the first R bytes to write into the destination register 124. The second load instruction reads the bytes C0-C7, which is an aligned read access from the source buffer 122 within the memory 120. In order to find the byte offset that will be the first byte in each of the blocks in the destination buffer 124 that are aligned with the size of the registers 110 and 130, the following formula may be used: R−[abs(destination start offset−source start offset)]+1. The notation abs( ) represents an absolute value.

The destination start offset, which may also be referred to as the destination offset, is an offset of the start address for the destination buffer from a consecutively prior address aligned with the width of the registers 110 and 130. In the example shown in FIG. 9, the consecutively prior address aligned with R, which is the width of the registers 110 and 130, points to the byte N0. The starting address for the destination buffer points to the byte N5 before the copy operation begins. Therefore, the destination offset is 5.

Similarly, the source start offset, which may also be referred to as the source offset, is an offset of the start address for the source buffer from a consecutively prior address aligned with the width of the registers 110 and 130. In the example shown in FIG. 9, the consecutively prior address aligned with R, which is the width of the registers 110 and 130, points to the byte B0. The starting address for the source buffer points to the byte B5 before the copy operation begins. Therefore, the source offset is 5.

In this example, the above formula provides 8−(5−5)+1 is 9, which wraps around to 0. The byte offset of 0 provides the bytes C0, D0 and E0 as the start bytes in each of the aligned R-byte blocks in the destination buffer 124. In this example, the destination buffer 124 is located after the source buffer 122. However, in other examples, the destination buffer 124 may be located before the source buffer 122.

The first 3 bytes are written with a single write operation that utilizes 8-bytes. The 7 remainder bytes are written with a single write operation that utilizes 8-bytes, rather than being written with multiple write operations or store instructions. The software application does not wait beyond the single write operation for the remainder bytes and performance may increase.

Figure 10:
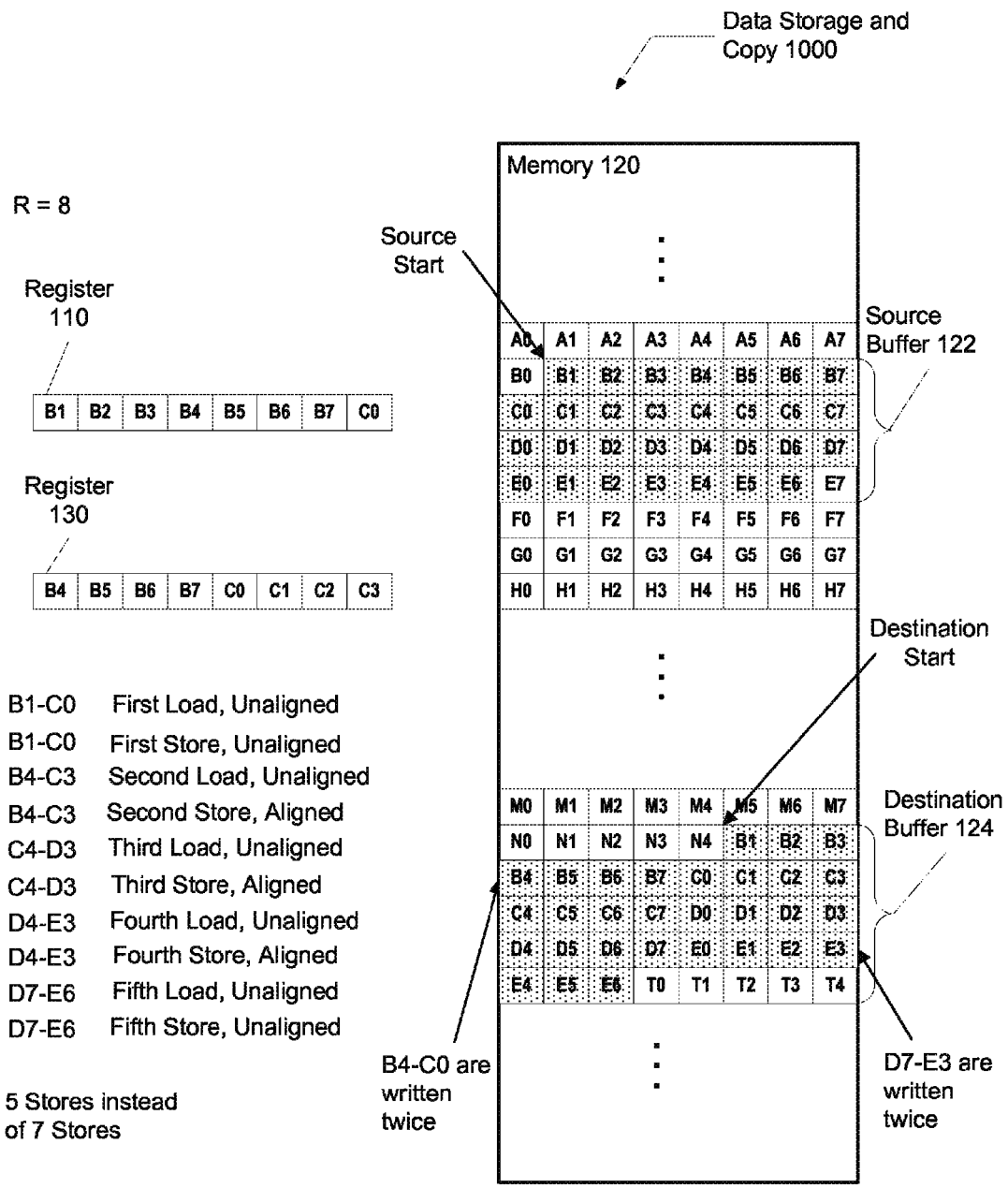
FIG. 10 is a generalized block diagram of another embodiment of data storage and copying.

Turning now to FIG. 10, another embodiment of data storage and copying 1000 in a memory is shown. As shown in the illustrated example, the source buffer 122 begins at byte B1 and ends at byte E6. The destination buffer begins at byte N5 (not shown) and ends at the byte prior to T0. After the copy operation, the destination buffer 124 will store bytes B1 to E6 as shown. The source buffer 122 and the destination buffer 124 do not overlap in this example. The starting addresses of the buffers 122 and 124 are not a multiple of the size of the register. In this example, the starting addresses for the buffers 122 and 124 are not on an 8-byte boundary. The source buffer 122 has a starting offset of a byte whereas the destination buffer 124 has a starting offset of 5 bytes. The source buffer 122 has 7 remainder bytes whereas the destination buffer 124 has 3 remainder bytes.

Writing the entire R-byte contents of the registers 110 and 130 into the memory 120 while performing store instructions for the copy operation yields five pairs of read and write operations. Since the source buffer 122 and the destination buffer 124 have different starting offsets, the read and write operations (load and store instructions) within a given pair of operations may not be both aligned or both unaligned. They may differ as shown. For example, the second load instruction reads the bytes B4-C3, which is an unaligned access from the source buffer 122. However, the second store instruction writes the bytes B4-C3, which is an aligned access into the destination buffer 124. The bytes B4-C0 and the bytes D7-E3 are written twice. By utilizing the entire R-byte contents of the registers 110 and 130 for store instructions, the total number of instructions for the copy operation is reduced, and thus, causes the software application to wait less.

Figure 11:
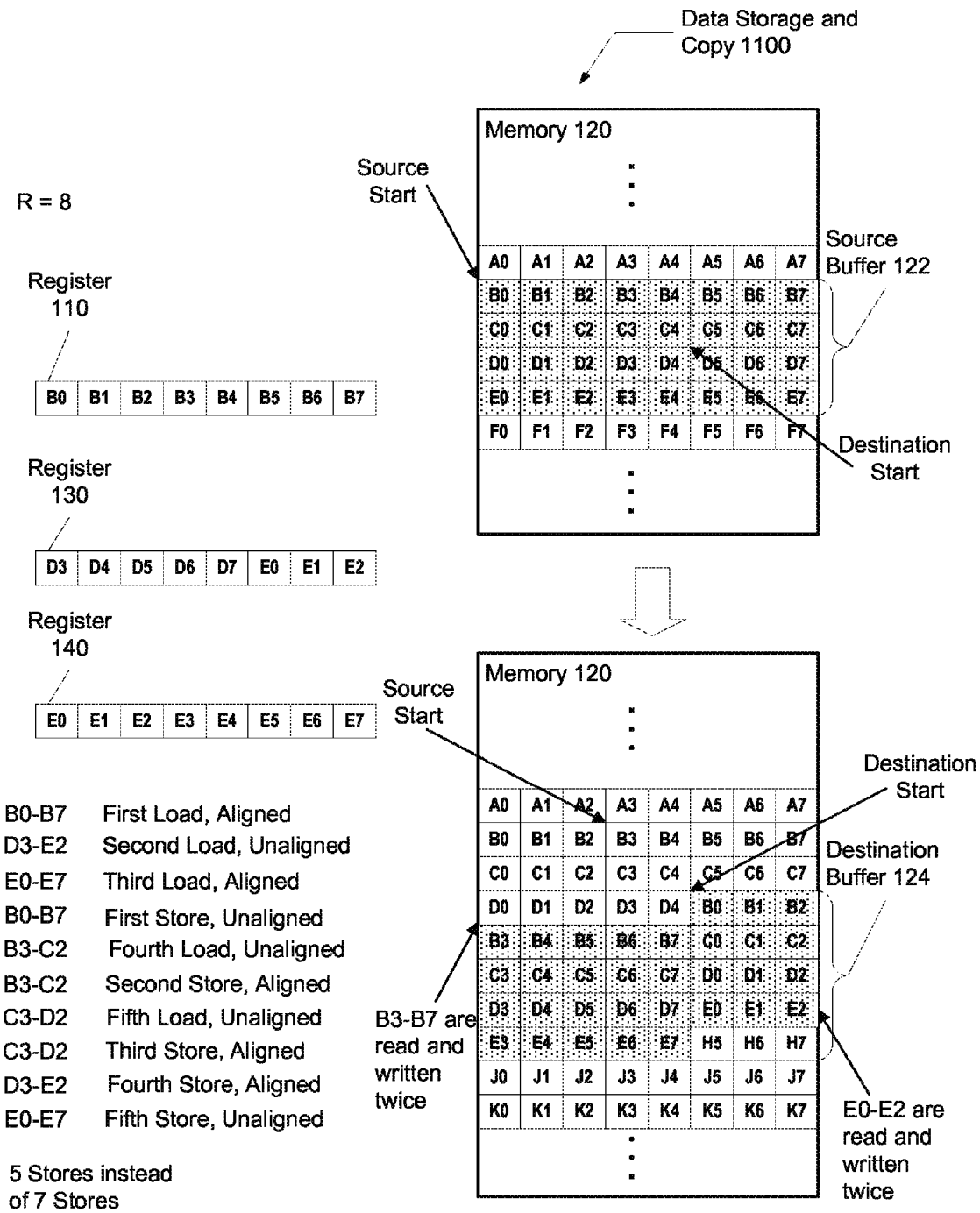
FIG. 11 is a generalized block diagram of another embodiment of data storage and copying.

Referring now to FIG. 11, another embodiment of data storage and copying 1100 in a memory is shown. As shown in the illustrated example, the source buffer 122 begins at byte B0 and ends at byte E7. The destination buffer begins at byte D5 and ends at byte H4. After the copy operation, the destination buffer 124 will store bytes B0 to E7 as shown. The source buffer 122 and the destination buffer 124 overlap in this example. The starting address of the source buffer 122 is aligned with the width of the registers 110, 130 and 140.

The starting address of the destination buffer 124 is unaligned with the width of the registers 110, 130 and 140. In this example, the starting address for the destination buffer 124 is not on an 8-byte boundary. The source buffer 122 has a starting offset of 0 bytes whereas the destination buffer 124 has a starting offset of 5 bytes. The source buffer 122 has 0 remainder bytes whereas the destination buffer 124 has 5 remainder bytes.

Performing the copy operation yields five read operations and five write operations with some operations aligned with the size of the registers 110, 130 and 140 and others unaligned as shown. Each of the write operations (store instructions) writes the entire R-byte contents of a given one of the registers 110, 130 and 140 into the memory 120. In this example where the source buffer 122 and the destination buffer 124 are overlapped, the first store instruction does not occur until at least three load instructions have been performed. Otherwise, data to be read may be overwritten early and the data becomes corrupted.

As shown, the first load instruction reads the bytes B0-B7, which is an aligned read access from the source buffer 122. These are the first R bytes to write into the destination register 124. The second load instruction reads the bytes D3-E2, which is an unaligned read access from the source buffer 122 within the memory 120. However, these bytes will provide a later aligned write access into the destination buffer 124. The 11 bytes D5-E7 need to be protected before being overwritten. The read access of the bytes D3-E2 both provides a portion of this protection and storage of bytes for a later aligned write access.

In order to find the byte offset that will be the first byte in each of the blocks in the destination buffer 124 that are aligned with the size of the registers 110, 130 and 140, the following formula may be used: R−[abs(destination start offset−source start offset)]+1. In this example, the formula provides 8−(5−0)+1 is 4. The byte offset of 4 provides the bytes B3, C3, D3 and E3 as the start bytes in each of the aligned R-byte blocks in the destination buffer 124. In this example, the destination buffer 124 is located after the source buffer 122. However, in other examples, the destination buffer 124 may be located before the source buffer 122. In these other examples, the overlap would occur between the end of the destination buffer 124 and the start of the source buffer 122. For these scenarios when each of the source buffer 122 and the destination buffer 124 have a non-overlap address space equal to or greater than R, the copy operation may occur as described in the examples illustrated in FIGS. 9 and 10 as a portion of the source buffer 122 is not corrupted during the write operations.

Continuing with the example illustrated in FIG. 11, the third load instruction reads the bytes E0-E7, which is an aligned read access from the source buffer 122. These bytes will provide a later unaligned and last write access into the destination buffer 124. As described above, the 11 bytes D5-E7 need to be protected before being overwritten. The read access of the bytes E0-E7 both provides a portion of this protection and storage of bytes for the last write access. The registers 110-140 may be used to store the contents of these three load instructions and later load instructions. The first store instruction writes the bytes B0-B7 beginning at the location that previously stored the byte D5. Therefore, the first store instruction is an unaligned write access into the destination buffer 124.

Although the first store instruction modifies eight bytes of the source buffer 122 that originally stored the bytes D5-E4, these bytes are preserved in the registers 130-140. The other load instructions and store instructions occur as shown in the figure. With a different number of registers than the three registers 110-140, more load instructions may be performed prior to the first store instruction. Again, by utilizing the entire R-byte contents of the registers 110-140 for store instructions, the total number of instructions for the copy operation is reduced, and thus, causes the software application to wait less.

Figure 12:
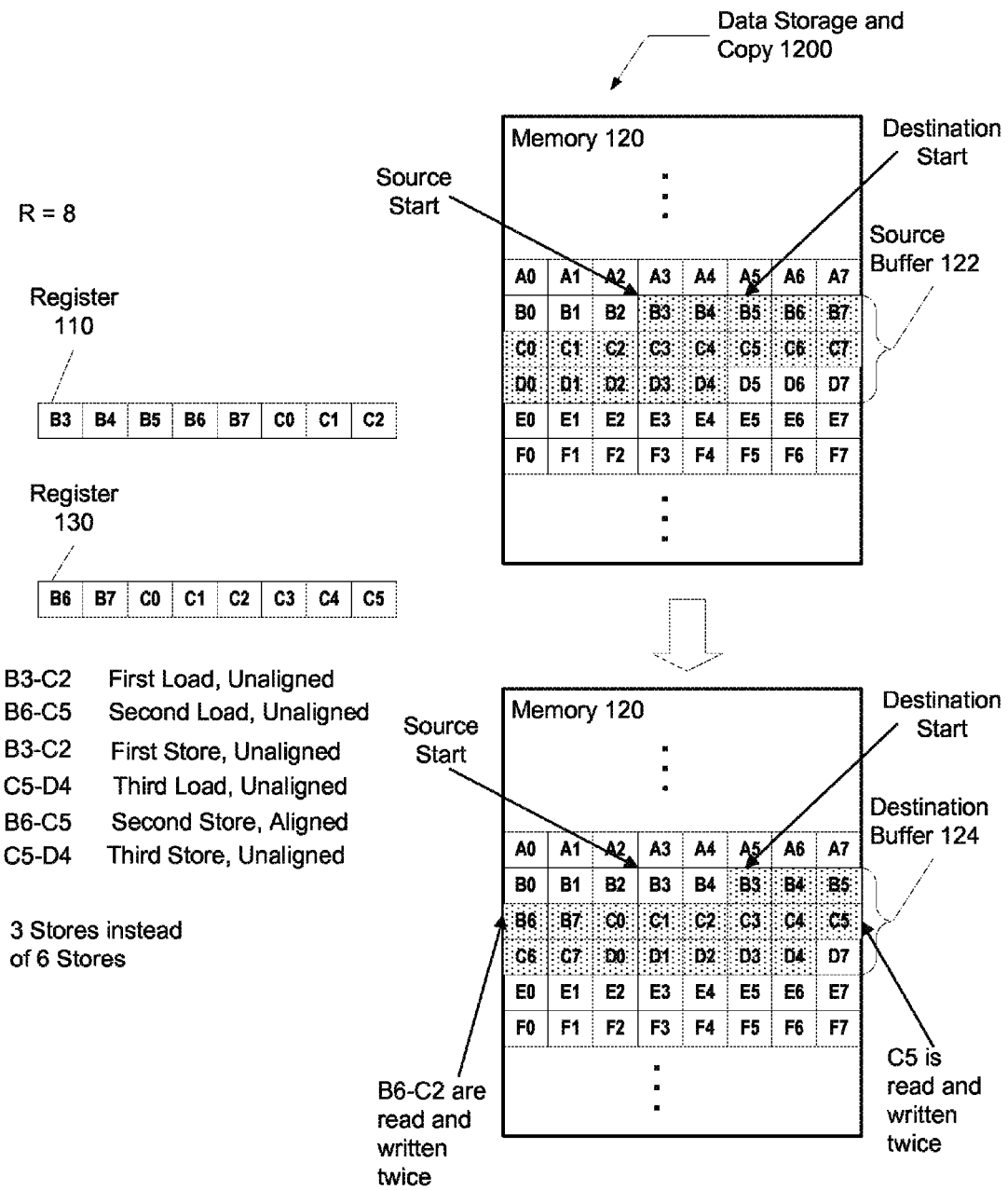
FIG. 12 is a generalized block diagram of another embodiment of data storage and copying.

Referring now to FIG. 12, another embodiment of data storage and copying 1200 in a memory is shown. As shown in the illustrated example, the source buffer 122 begins at byte B3 and ends at byte D4. The destination buffer begins at byte B5 and ends at the byte D6. After the copy operation, the destination buffer 124 will store bytes B3 to D4 as shown. The source buffer 122 and the destination buffer 124 overlap in this example. The starting addresses of the buffers 122 and 124 are not a multiple of the size of the register. In this example, the starting addresses for the buffers 122 and 124 are not on an 8-byte boundary. The source buffer 122 has a starting offset of 3 bytes whereas the destination buffer 124 has a starting offset of 5 bytes within the same 8-byte block. The source buffer 122 has 5 remainder bytes whereas the destination buffer 124 has 7 remainder bytes.

Performing the copy operation yields three pairs of read and write operations with some operations aligned with the register width and others unaligned as shown. Each of the write operations (store instructions) writes the entire R-byte contents of a given one of the registers 110-140 into the memory 120. In this example where the source buffer 122 and the destination buffer 124 are overlapped, the first store instruction does not occur until at least two load instructions have been performed. Otherwise, data to be read may be overwritten early and the data becomes corrupted.

As shown, the first load instruction reads the bytes B3-C2, which is an unaligned read access from the source buffer 122. These are the first R bytes to write into the destination register 124. The second load instruction reads the bytes B6-C5, which is also an unaligned read access from the source buffer 122. However, these bytes will provide a later aligned write access into the destination buffer 124. The 5 bytes C0-C4 need to be protected before being overwritten. The read access of the bytes B6-C5 both provides this protection and storage of bytes for a later aligned write access.

In order to find the byte offset that will be the first byte in each of the blocks in the destination buffer 124 that are aligned with the size of the registers 110 and 130, the following formula may be used: R−[abs(destination start offset−source start offset)]+1. In this example, the formula provides 8−(5−3)+1 is 7. The byte offset of 7 provides the bytes B6 and C6 as the start bytes in each of the aligned R-byte blocks in the destination buffer 124. In this example, the destination buffer 124 is located after the source buffer 122. However, in other examples, the destination buffer 124 may be located before the source buffer 122.

The registers 110 and 130 may be used to store the contents of the load instructions. The first store instruction writes the bytes B3-C2, which is an unaligned write access into the destination buffer 124. Although the first store instruction modifies the first five bytes of the block that originally stored the bytes C0-C4, these bytes are preserved in the register 130 for a later write access. The other load instructions and store instructions occur as shown in the figure. With a different number of registers than the two registers 110 and 130, more load instructions may be performed prior to the first store instruction. Again, by utilizing the entire R-byte contents of the registers 110 and 130 for store instructions, the total number of instructions for the copy operation is reduced, and thus, causes the software application to wait less.

Figure 13:
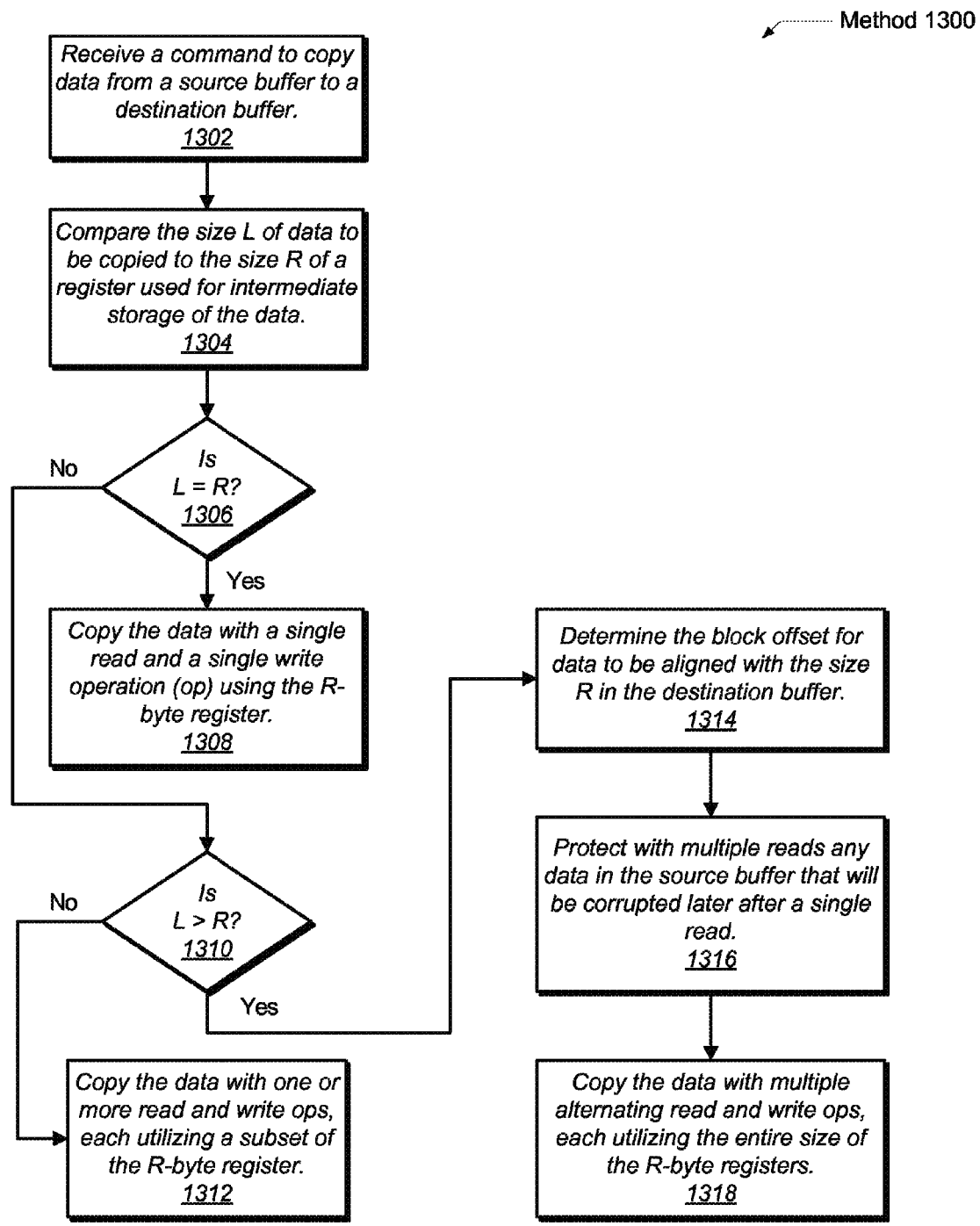
FIG. 13 is a generalized flow diagram of one embodiment of a method for efficiently copying data between buffers in memory.

Turning now to FIG. 13, one embodiment of a method 1300 for efficiently copying data between buffers in memory is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 1302, a command is received to copy data from a source buffer to a destination buffer. The command may be an instruction that is part of a function call. One example of the function call is the memcpy function call in the C and C++ programming languages. When processing the one or more instructions for the data copy function call, in block 1304, the size L of data to be copied is compared to the size R of a register used for intermediate storage of the data. If the sizes being compared are equal (conditional block 1306), then in block 1308, the data in the source buffer is copied to the destination buffer with a single read operation and a single write operation using the R-byte register.

If the size L is less than the size R (conditional block 1310), then in block 1312, the data in the source buffer is copied to the destination buffer with one or more read and write operations, each utilizing a subset of the R-byte register. For example, the write operations may utilize data with a power-of-2 size.

If the size L is greater than the size R (conditional block 1310), then in block 1314, the block offset is determined for data to be aligned with the size R in the destination buffer. In the previous examples, in order to find the byte offset that will be the first byte in each of the blocks in the destination buffer 124 that are aligned with the R-byte size of the registers 110, 130 and 140, the following formula may be used: R−[abs(destination start offset−source start offset)]+1.

In various embodiments, the first load instruction reads the first R-bytes from the start of the source buffer. As shown in the earlier example in FIG. 11, bytes B3-C2 are read from the source buffer 122 and stored in register 110. The first aligned location in the destination buffer after the first location configured to store the first byte may be identified. In the example in FIG. 11, the first aligned location in the destination buffer 124 is configured to store byte B6. The position in the source buffer storing the byte corresponding to the first aligned position in the destination buffer is identified. In the example in FIG. 11, this position has a byte offset of 3 from the first location in the source buffer 122. The second load instruction reads R-bytes from the identified position in the source buffer. As shown in the earlier example in FIG. 11, bytes B6-C5 are read from the source buffer 122 and stored in register 130.

The source buffer and the destination buffer may not overlap address space with one another. In the previous examples illustrated in FIGS. 9 and 10, the buffers did not overlap address space. However, in the previous examples illustrated in FIGS. 11 and 12, the buffers did overlap address space. If the source buffer and the destination buffer do not overlap address space with one another, then data is not corrupted during the read and write operations. If the source buffer and the destination buffer do overlap address space with one another, but the destination buffer is located before the source buffer and the non-overlap address space for each of the source buffer and the destination buffer is equal to or greater than R, then data is not corrupted during the read and write operations.

If the source buffer and the destination buffer do overlap address space with one another, but the destination buffer is located before the source buffer and the non-overlap address space for each of the source buffer and the destination buffer is less than R, then data may be corrupted. If only a single read operation is used on the start data of the source buffer before writing the same locations for the destination buffer, then data will be corrupted. Similarly, if the source buffer and the destination buffer do overlap address space with one another, and the destination buffer is located after the source buffer as shown in FIGS. 11 and 12, and the non-overlap address space for each of the source buffer and the destination buffer is less than R, then data may be corrupted. Again, if only a single read operation is used on the start data of the source buffer before writing the same locations for the destination buffer, then data will be corrupted.

In block 1316, at least 2 read operations are used to protect any data in the source buffer that will be corrupted later by a write operation after a single read. Referring again to the previous example in FIG. 11, the 11 bytes D5-E7 are protected with multiple read operations prior to a write operation to the locations storing them. Referring again to the previous example in FIG. 12, the 5 bytes C0-C4 are protected with multiple read operations prior to a write operation to the locations storing them.

In block 1318, data in the source buffer is copied to the destination buffer with multiple read and write operations, each utilizing the entire contents of an R-byte register. Two or more R-byte registers may be used for the copy operation as shown in the previous examples in FIGS. 9-12. The steps described earlier in method 800 may be used for the copy operation, although the data to write is first read from the source buffer, rather than replicated from a specified value. The read and write operations for the copy operation are illustrated in the examples shown in FIGS. 9-12.

Some of the data in the source buffer is loaded twice prior to being written into the destination buffer. In the example in FIG. 11, the bytes B6-C2 and the byte C5 is read twice and written twice. With a different number of registers than the two registers 110 and 130, more load instructions may be performed prior to the store instructions. Again, by utilizing the entire size of the R-byte registers 110 and 130, the total number of instructions for the copy operation is reduced, and thus, causes the software application to wait less.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a register configured to store R bytes of data;
   a memory comprising one or more buffers; and
   a processor coupled to the memory, wherein the processor is configured to:
   receive an operation configured to write L bytes of data currently stored in the register into a destination buffer of the one or more buffers within the memory; and
   write more than L bytes of data to the destination buffer, said L bytes of data representing the data currently stored in the register, responsive to determining:
   L is greater than R; and
   L is not an integer multiple of R.

2. The computing system as recited in claim 1, wherein the processor is further configured to write the more than L bytes of data into the destination buffer with a plurality of write operations, wherein each of the plurality of write operations writes R bytes of data.

3. The computing system as recited in claim 1, wherein in response to determining a starting address of the destination buffer is not an integer multiple of R, the processor is configured to:
   perform a first write of R bytes of data beginning at the starting address; and
   perform a second write R bytes of data beginning at an address after the starting address that is an integer multiple of R, wherein the second write overwrites a portion of valid data written by the first write.

4. The computing system as recited in claim 1, wherein in response to determining a first address pointing to a location immediately after an end of the destination buffer is not an integer multiple of R, the processor is configured to write R bytes of data starting at an address located R bytes prior to an end of the destination buffer.

5. The computing system as recited in claim 1, wherein the processor is further configured to overwrite a portion of the more than L bytes written by a first write of R bytes with a different portion of the more than L bytes written by a second write of R bytes, wherein the second write starts at a location within the destination buffer that is different than a starting location of the first write within the destination buffer.

6. The computing system as recited in claim 1, wherein data to be placed in the destination buffer within the memory is from a source buffer of the one or more buffers within the memory, wherein:
   the source buffer comprises L bytes of data;
   L is greater than R; and
   the processor is configured to read more than L bytes of data from the source buffer responsive to determining L is not an integer multiple of R.

7. The computing system as recited in claim 6, wherein each read operation for the source buffer and each write operation for the destination buffer is an operation on R bytes of data.

8. The computing system as recited in claim 6, wherein the processor is further configured to read from the source buffer and write to the destination buffer R bytes of data at a time responsive to determining L is not an integer multiple of R.

9. The computing system as recited in claim 1, wherein responsive to determining L is greater than R and L is not an integer multiple of R, the processor is configured to perform the operation using only writes that include exactly R bytes of data from the register.

10. A method comprising:
    receiving an operation configured to write L bytes of data currently stored in a register configured to store R bytes of data into a destination buffer of one or more buffers within a memory;
    writing more than L bytes to the destination buffer, said L bytes of data representing the data currently stored in the register, responsive to determining:
    L is greater than R; and
    L is not an integer multiple of R.

11. The method as recited in claim 10, wherein the method further comprises writing the more than L bytes of data into the destination buffer with a plurality of write operations, wherein each of the plurality of write operations writes R bytes of data.

12. The method as recited in claim 10, wherein in response to determining a starting address of the destination buffer is not an integer multiple of R, the method further comprises:
    performing a first write of R bytes of data beginning at the starting address; and
    performing a second write R bytes of data beginning at an address after the starting address that is an integer multiple of R, wherein the second write overwrites a portion of valid data written by the first write.

13. The method as recited in claim 12, wherein in response to determining a second address pointing to a location immediately after an end of the destination buffer is not an integer multiple of R, the method further comprises writing R bytes of data starting at a third address located R bytes prior to an end of the destination buffer.

14. The method as recited in claim 10, wherein responsive to determining L is greater than R and L is not an integer multiple of R, the method comprises performing the operation using only writes that include exactly R bytes of data from the register.

15. A non-transitory computer readable storage medium storing program instructions, wherein the program instructions are executable to:
receive an operation configured to write L bytes of data currently stored in a register configured to store R bytes of data into a destination buffer of one or more buffers within a memory;
write more than L bytes to the destination buffer, said L bytes of data representing the data currently stored in the register, responsive to determining:
L is greater than R; and
L is not an integer multiple of R.

16. The non-transitory computer readable storage medium as recited in claim 15, wherein the program instructions are further executable to write the more than L bytes of data into the destination buffer with a plurality of write operations, wherein each of the plurality of write operations writes R bytes of data.

17. The non-transitory computer readable storage medium as recited in claim 15, wherein in response to determining a starting address of the destination buffer is not an integer multiple of the R, the program instructions are further executable to:
perform a first write of R bytes of data beginning at the starting address; and
perform a second write R bytes of data beginning at an address after the starting address that is an integer multiple of R, wherein the second write overwrites a portion of valid data written by the first write.

18. The non-transitory computer readable storage medium as recited in claim 15, wherein in response to determining a second address pointing to a location immediately after an end of the destination buffer is not an integer multiple of the R, the program instructions are further executable to write R bytes of data starting at a third address located R bytes from an end of the destination buffer.

19. The computing system as recited in claim 1, wherein the operation specifies that L bytes of data are to be written, and the processor is configured to write the more than L bytes of data to the destination buffer in further response to the operation.

* * * * *